(12) United States Patent
Kim (10) Patent No.: US 8,498,058 B2
(45) Date of Patent: Jul. 30, 2013

(54) ZOOM LENS AND IMAGE PICKUP DEVICE INCLUDING THE SAME

(75) Inventor: Dong-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 12/917,640

(22) Filed: Nov. 2, 2010

(65) Prior Publication Data

US 2011/0134540 A1    Jun. 9, 2011

(30) Foreign Application Priority Data

Dec. 4, 2009 (KR) .................. 10-2009-0119913

(51) Int. Cl.
*G02B 15/14* (2006.01)

(52) U.S. Cl.
USPC .......................................... 359/687; 359/684

(58) Field of Classification Search
USPC ................................. 359/687, 684
See application file for complete search history.

(56) References Cited

U.S. PATENT DOCUMENTS

| 6,016,228 A * | 1/2000 | Uzawa ............ 359/687 |
| 2002/0118467 A1 * | 8/2002 | Ozaki ............ 359/687 |

FOREIGN PATENT DOCUMENTS

| JP | 2004-286811 A | 10/2004 |
| JP | 2006-337419 A | 12/2006 |
| JP | 2007-171371 A | 7/2007 |

* cited by examiner

*Primary Examiner* — Scott J Sugarman
(74) *Attorney, Agent, or Firm* — Drinker Biddle & Reath LLP (57) ABSTRACT

A zoom lens and an image pickup device including the same. The zoom lens includes a first lens group having a positive refractive power, a second lens group having a negative refractive power, a third lens group having a positive refractive power, and a fourth lens group having a positive refractive power. The first through fourth lens groups are sequentially arranged from an object side. The second lens group includes a lens formed of a material having a low refractive index.

17 Claims, 7 Drawing Sheets

ZOOM LENS AND IMAGE PICKUP DEVICE INCLUDING THE SAME

CROSS-REFERENCE TO RELATED PATENT APPLICATION

This application claims the benefit of Korean Patent Application No. 10-2009-0119913, filed on Dec. 4, 2009, in the Korean Intellectual Property Office, the disclosure of which is incorporated herein in its entirety by reference.

BACKGROUND

1. Field of the Invention

The invention relates to a zoom lens that is compact and inexpensive and has a high zoom ratio and an image pickup device including the zoom lens.

2. Description of the Related Art

Zoom lenses employed in digital cameras or digital camcorders having image pickup devices such as charge-coupled devices (CCDs) or complementary metal-oxide semiconductors (CMOSs) are required to be compact and provide high optical performance. However, it is difficult to reduce the size of a zoom lens while providing high performance, and it is difficult to reduce manufacturing costs while reducing the size of the zoom lens because an expensive aspherical material having a high refractive index is used in order to reduce the size of the zoom lens. Accordingly, it is difficult to satisfy demands for both high optical performance and low manufacturing costs.

SUMMARY

An embodiment of the invention provides a zoom lens that is compact and inexpensive.

An embodiment of the invention also provides an image pickup device including a zoom lens that is compact and inexpensive.

According to an embodiment of the invention, there is provided a zoom lens including: a first lens group having a positive refractive power; a second lens group having a negative refractive power; a third lens group having a positive refractive power; and a fourth lens group having a positive refractive power, wherein the first through fourth lens groups are sequentially arranged from an object side to an image side, when zooming is performed from a wide angle position to a telephoto position, the distance between the first lens group and the second lens group increases, the distance between the second lens group and the third lens group decreases, and the distance between the third lens group and the fourth lens group increases, the second lens group comprises a first lens, a second lens, and a third lens, and the second lens group satisfies $$1.45 \leq N_{(2-2)} \leq 1.65, \text{ and}$$

$$1.45 \leq N_{(2-3)} \leq 1.65,$$

where $N_{(2-2)}$ is the refractive index of the second lens of the second lens group, and $N_{(2-3)}$ is the refractive index of the third lens of the second lens group.

The first lens of the second lens group may have a negative refractive power, the second lens of the second lens group may have a negative refractive power, and the third lens of the second lens group may have a positive refractive power.

The second lens and the third lens of the second lens group may be aspherical lenses.

The first lens of the second lens group may be a biconcave lens, and the second lens and the third lens of the second lens group may be meniscus lenses.

The second lens and the third lens of the second lens group may be plastic lenses.

The zoom lens may satisfy $$4.6 \leq \frac{ft}{fw} \leq 5.4,$$

and $$1.45 \leq N_{(3-1)} \leq 1.65,$$

where fw is the overall focal length at the wide angle position, ft is the overall focal length at the telephoto position, and $N_{(3-1)}$ is the refractive index of the lens closest to the object side of the third lens group.

The third lens group may include a doublet lens.

According to another embodiment of the invention, there is provided an image pickup device including: a zoom lens; and an image sensor for converting an optical image formed by the zoom lens into an electrical signal, wherein the zoom lens comprises: a first lens group having a positive refractive power; a second lens group having a negative refractive power; a third lens group having a positive refractive power; and a fourth lens group having a positive refractive power, wherein the first through fourth lens groups are sequentially arranged from an object side to an image side, when zooming is performed from a wide angle position to a telephoto position, the distance between the first lens group and the second lens group increases, the distance between the second lens group and the third lens group decreases, and the distance between the third lens group and the fourth lens group increases, the second lens group comprises a first lens, a second lens, and a third lens, and the second lens group satisfies $$1.45 \leq N_{(2-2)} \leq 1.65, \text{ and}$$

$$1.45 \leq N_{(2-3)} \leq 1.65,$$

where $N_{(2-2)}$ is the refractive index of the second lens of the second lens group, and $N_{(2-3)}$ is the refractive index of the third lens of the second lens group.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Embodiments of the invention will now be described more fully with reference to the accompanying drawings.

Figure 1:
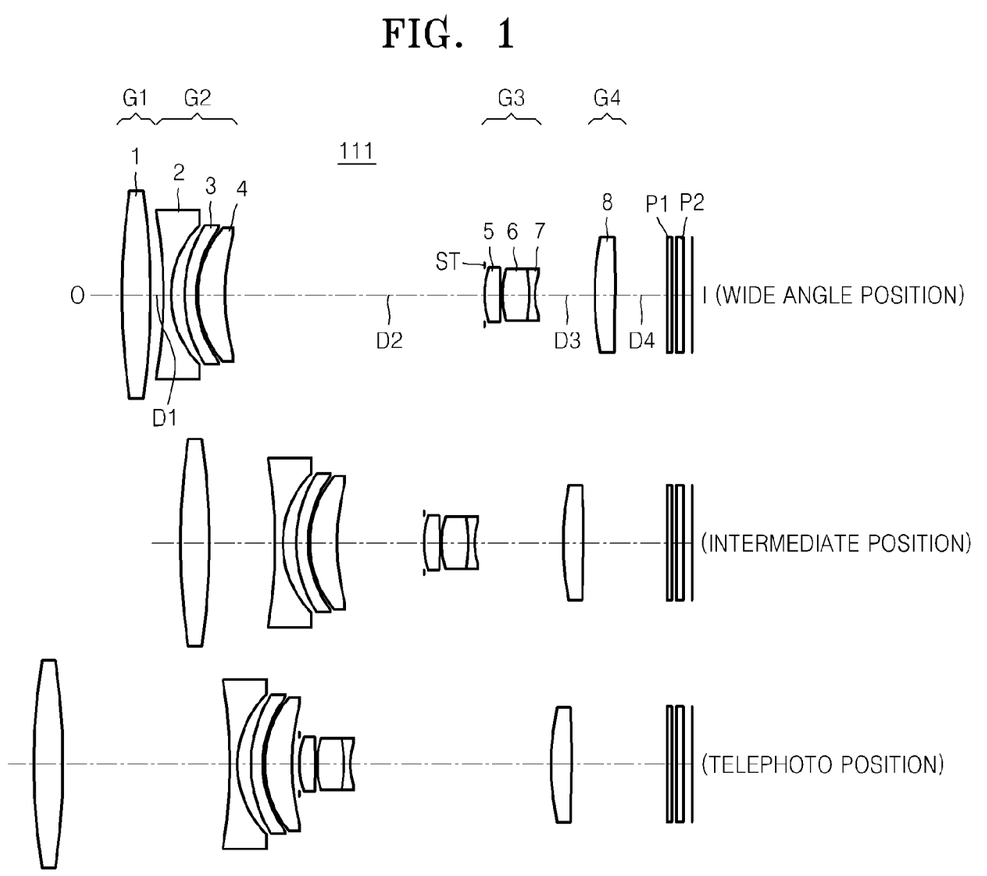
FIG. 1 is a cross-sectional view of a zoom lens according to an embodiment of the invention at a wide angle position, an intermediate position, and a telephoto position.

FIG. 1 is a cross-sectional view of a zoom lens 111 according to an embodiment of the invention. The zoom lens 111 may include a first lens group G1 having a positive refractive power, a second lens group G2 having a negative refractive power, a third lens group G3 having a positive refractive power, and a fourth lens group G4 having a positive refractive power. The first through fourth lens groups G1 through G4 are sequentially arranged from an object side O to an image side.

When zooming is performed from a wide angle position to a telephoto position, the distance between the first lens group G1 and the second lens group G2 increases, the distance between the second lens group G2 and the third lens group G3 decreases, and the distance between the third lens group G3 and the fourth lens group G4 increases. During zooming, the fourth lens group G4 may focus an image on an image plane while the image plane is moved.

The first lens group G1 may include a first lens 1. The first lens 1 may be a biconvex lens. The zoom lens 111 of FIG. 1 may correct distortion and chromatic aberration by using software. According to an embodiment, when the zoom lens 111 corrects aberration by using software, the first lens group G1 may consist of only one lens. Since the first lens group G1 includes one lens, the thickness of a lens holder of the zoom lens 111 is reduced, thereby allowing for miniaturizing of the zoom lens 111.

The second lens group G2 may include a second lens 2, a third lens 3, and a fourth lens 4 which are sequentially arranged from the object side O. The second lens 2, the third lens 3, and the fourth lens 4 may have a negative power, a negative power, and a positive power, respectively. The second lens 2 may be a biconcave lens, and the third lens 3 and the fourth lens 4 may be meniscus lenses that are convex toward the object side O. Since the second lens group G2 includes two meniscus lenses, the thickness of the second lens group G2 is reduced, thereby allowing for miniaturizing of the zoom lens 111.

The third lens 3 and the fourth lens 4 of the second lens group G2 may be aspherical lenses. An outer diameter of the second lens 2, which is closest to the object side O among the second, third, and fourth lenses 2, 3, and 4 of the second lens group G2, is greater than that of each of the third and fourth lenses 3 and 4. Since the second lens 2 having the greatest outer diameter among the lenses of the second lens group G2 is a spherical lens, manufacturing costs may be reduced. If the third lens 3 and the fourth lens 4 are plastic lenses, and not aspherical lenses, manufacturing costs may be further reduced. Although a plastic lens shows a great change in performance and the position of an image plane when temperature changes, if the third lens 3 is a negative lens and the fourth lens 4 is a positive lens, the change in the performance and the position of the image plane caused during the temperature change may be compensated for and reduced.

The third lens group G3 may include a fifth lens 5, a sixth lens 6, and a seventh lens 7. The fifth lens 5 may include an aspherical convex lens to reduce spherical aberration. The sixth lens 6 may have a positive refractive power and the seventh lens 7 may have a negative refractive power. The sixth lens 6 and the seventh lens 7 are cemented together as a doublet lens, thereby reducing lateral chromatic aberration that occurs during zooming. The third lens group G3 further includes an aperture stop ST, and the stop ST may move along with the fifth, sixth, and seventh lenses 5, 6, and 7 during zooming.

The fourth lens group G4 may include an eighth lens 8. According to an embodiment, the fourth lens group G4 may consist of only one lens to allow for miniaturization of the zoom lens 111. The eighth lens 8 may be a spherical lens having a refractive index greater than 1.85. If the eighth lens 8 is a lens having a high refractive index, angles at which light may be incident on the image plane at the wide angle position may be limited.

According to an embodiment, the number of lenses is reduced and the zoom lens 111 may be miniaturized. Also, the second lens group G2 may include a lens having a low refractive index. Accordingly, the zoom lens 111 may be manufactured at low cost and still have a high magnifying power.

The second lens group G2 may satisfy $$1.45 \leq N_{(2-2)} \leq 1.65 \quad \text{[Formula 1], and}$$

$$1.45 \leq N_{(2-3)} \leq 1.65 \quad \text{[Formula 2],}$$

where $N_{(2-2)}$ is the refractive index of the lens second from the object side O of the second lens group G2 at d-line (corresponding to a wavelength of 587.56 nm), and $N_{(2-3)}$ is the refractive index of the lens third from the object side O of the second lens group G2 at d-line.

Formulae 1 and 2 define the refractive indexes of the lens second from the object side O and the lens third from the object side O of the second lens group G2. For example, the second lens and the third lens may be plastic lenses. A plastic lens may have low manufacturing costs and a high magnifying power. If either of the refractive indexes of the lens second and the lens third from the object side O of the second lens group G2 exceeds either of the upper limit or the lower limit of Formulae 1 and 2, it is difficult to form the lens second and the lens third from the object side O of the second lens group G2 by using a plastic material, thereby preventing a reduction in manufacturing costs.

The zoom lens 111 of FIG. 1 may satisfy $$4.6 \leq \frac{ft}{fw} \leq 5.4, \quad \text{[Formula 3]}$$

and $$1.45 \leq N_{(3-1)} \leq 1.65 \quad \text{[Formula 4]}$$

where fw is the focal length of the zoom lens 111 at the wide angle position, ft is the focal length of the zoom lens 111 at the telephoto position, and $N_{(3-1)}$ is the refractive index of the lens first from the object side O of the third lens group G3 at d-line.

Formula 3 defines the zoom ratio of the zoom lens 111, and Formula 4 defines the refractive index of the lens closest to the object side O of the third lens group G3. In general, in order to manufacture a zoom lens having high magnification, the zoom lens is formed of an aspherical material having a refractive index greater than 1.8, which allows aberration and magnification change to be easily corrected. However, since the third lens group G3 of FIG. 1 includes a lens having a low refractive index, manufacturing costs are reduced. For example, the fifth lens 5 of the third lens group G3 may be formed of an inexpensive plastic material, and the sixth lens 6 and the seventh lens 7 of the third lens group G3 may be formed of a material having a refractive index greater than 1.8 to correct aberration, thereby ensuring a high mangification.

The term 'aspherical' may be defined as follows.

An aspherical shape of the zoom lens 111 of FIG. 1 may be defined by Formula 5 when an optical axis is an X-axis, a direction perpendicular to the optical axis is a Y-axis, and a progressing direction of light is a positive direction. Here, x is the distance from the vertex of a lens in the direction of the optical axis, y is the height in the direction perpendicular to the optical axis, k is a conic constant, A, B, C, and D are aspherical coefficients, and c is the reciprocal of the radius of curvature R at the vertex of the lens (1/R).

$$x = \frac{cy^2}{1 + \sqrt{1-(K+1)c^2y^2}} + Ay^4 + By^6 + Cy^8 + Dy^{10}$$ [Formula 5]

Zoom lenses that are compact and inexpensive according to embodiments of the invention will now be explained in detail.

Hereinafter, f is the overall focal length of a zoom lens, Fno is an F-number, 2ω is a viewing angle, R is the radius of curvature, Dn is the thickness of the center of a lens or the distance between lenses, Nd is a refractive index, Vd is an Abbe number, ST is an aperture stop, D1, D2, D3, and D4 are variable distances, and ASP is an aspherical surface. The same reference numerals denote the same lenses constituting each of the lens groups in the drawings illustrating the embodiments. The unit of distance is mm. Reference numerals P1 and P2 denote a filter and a cover glass, respectively.

Embodiment 1

FIG. 1 is a cross-sectional view of the zoom lens 111 according to an embodiment of the invention at a wide angle position, an intermediate position, and a telephoto position.

| f; 5.74~12.34~27.26 Fno; 3.52~4.54~6.31 2ω; 68.05~34.86~16.18(°) | | | | |
|---|---|---|---|---|
| Lens surface | R | Dn | Nd | Vd |
| OBJ: | INFINITY | INFINITY | | |
| S1: | 49.06414 | 1.944224 | 1.563234 | 43.0271 |
| S2: | −52.95909 | D1 | | |
| S3: | −33.58705 | 0.500000 | 1.721998 | 54.0301 |
| S4: | 6.77772 | 0.947407 | | |
| S5: | 8.88959 | 0.800000 | 1.531200 | 56.5000 |
| ASP: | | | | |
| K: −3.777498 | | | | |
| A: 0.204272E−03 | B: −0.391787E−05 | C: 0.913440E−06 | | |
| D: −0.478500E−08 | | | | |
| S6: | 7.32921 | 0.108181 | | |
| ASP: | | | | |
| K: −1.391278 | | | | |
| A: −0.189619E−03 | B: 0.177159E−05 | C: 0.258997E−06 | | |
| D: 0.760549E−08 | | | | |
| S7: | 6.92935 | 1.860283 | 1.607000 | 27.5000 |
| ASP: | | | | |
| K: −0.124273 | | | | |
| A: −0.122570E−03 | B: 0.371982E−05 | C: 0.133363E−07 | | |
| D: −0.376327E−08 | | | | |
| S8: | 15.35505 | D2 | | |
| ASP: | | | | |
| K: −2.247425 | | | | |
| A: −0.875954E−04 | B: 0.377544E−06 | C: 0.132954E−07 | | |

| -continued | | | | |
|---|---|---|---|---|
| f; 5.74~12.34~27.26 Fno; 3.52~4.54~6.31 2ω; 68.05~34.86~16.18(°) | | | | |
| D: −0.548703E−08 | | | | |
| ST: | INFINITY | 0.000000 | | |
| S10: | 5.76773 | 1.137817 | 1.664981 | 48.6247 |
| ASP: | | | | |
| K: −1.000000 | | | | |
| A: −0.103136E−03 | B: 0.408325E−04 | C: −0.126460E−05 | | |
| D: 0.138422E−05 | | | | |
| S11: | −23.26064 | 0.100000 | | |
| S12: | 7.31009 | 1.828989 | 1.817970 | 45.5023 |
| S13: | −10.17563 | 0.400000 | 1.900720 | 27.5904 |
| S14: | 3.82348 | D3 | | |
| S15: | 19.79548 | 1.373099 | 1.926047 | 21.6306 |
| S16: | −320.67545 | D4 | | |
| S17: | INFINITY | 0.300000 | 1.516798 | 64.1983 |
| S18: | INFINITY | 0.300000 | | |
| S19: | INFINITY | 0.500000 | 1.516798 | 64.1983 |
| S20: | INFINITY | 0.600017 | | |
| IMG: | INFINITY | | | |

Table 1 shows data regarding variable distances of the zoom lens 111 of FIG. 1 during zooming.

TABLE 1

| Variable distance | Wide angle position | Intermediate position | Telephoto position |
|---|---|---|---|
| D1 | 0.8797 | 4.5355 | 11.4354 |
| D2 | 17.7126 | 5.8709 | 0.5 |
| D3 | 4.0873 | 6.0755 | 13.7722 |
| D4 | 3.6222 | 5.7801 | 6.5721 |

Figure 2A:
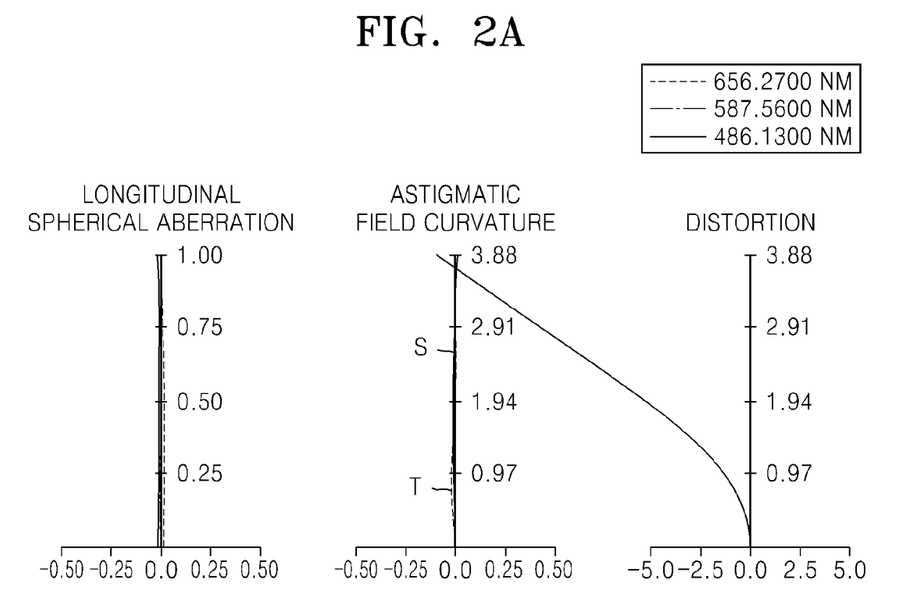
FIGS. 2A and 2B illustrate longitudinal spherical aberration, astigmatic field curvature, and distortion of the zoom lens of FIG. 1 at the wide angle position and the telephoto position.
Figure 2B:
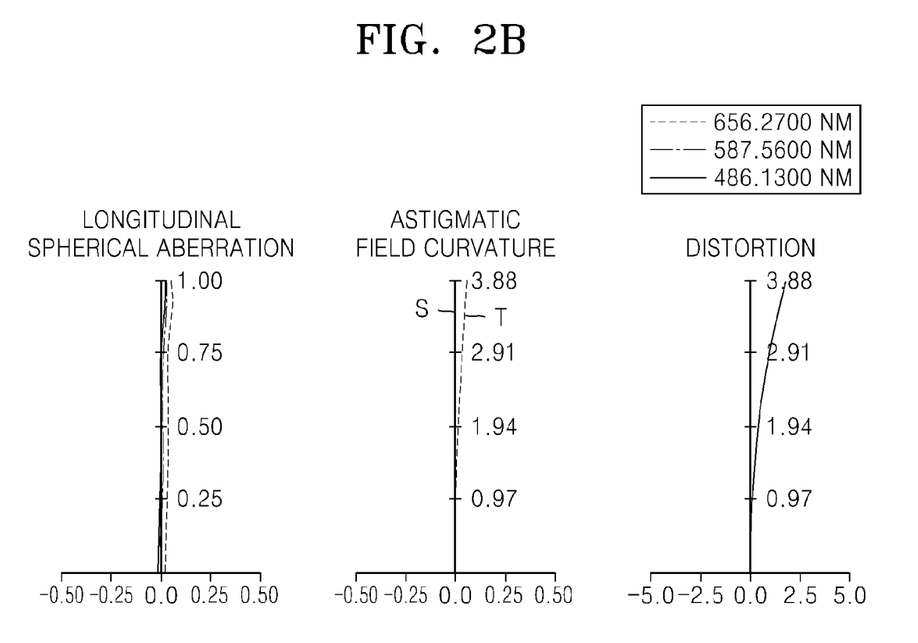

FIGS. 2A and 2B illustrate longitudinal spherical aberration, astigmatic field curvature, and distortion of the zoom lens 111 of FIG. 1 at the wide angle position and the telephoto position. The astigmatic field curvature includes tangential field curvature (T) and sagittal field curvature (S).

Embodiment 2

Figure 3:
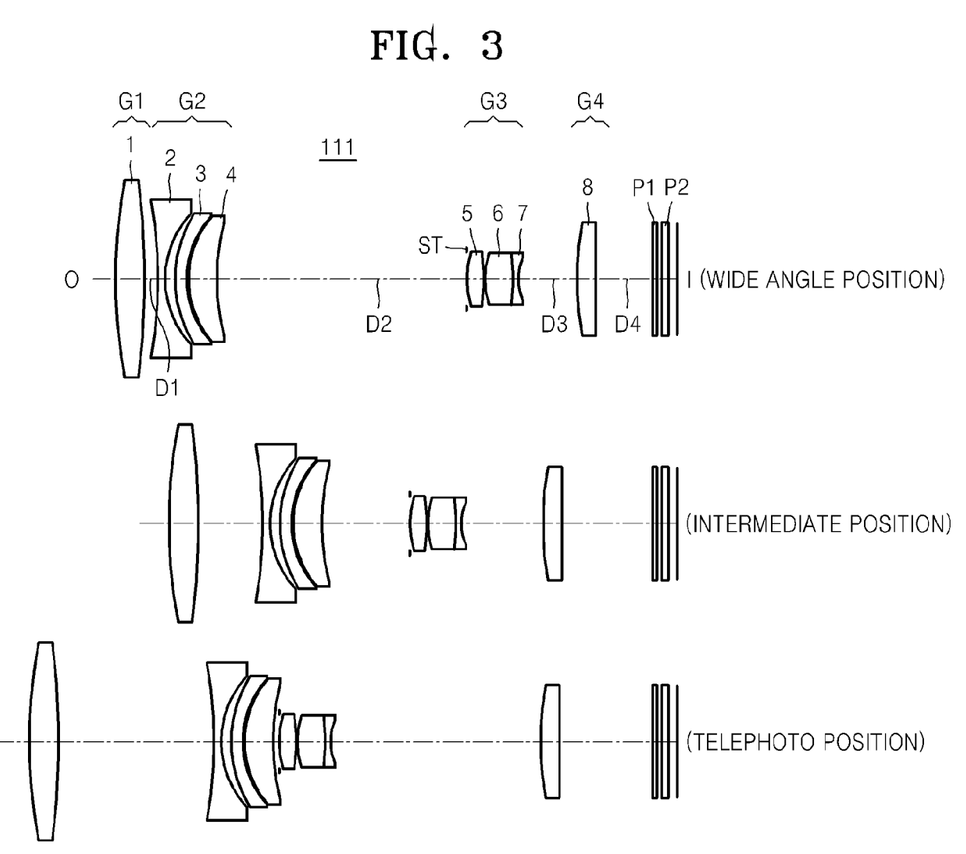
FIG. 3 is a cross-sectional view of a zoom lens according to another embodiment of the invention at a wide angle position, an intermediate position, and a telephoto position.
Figure 4A:
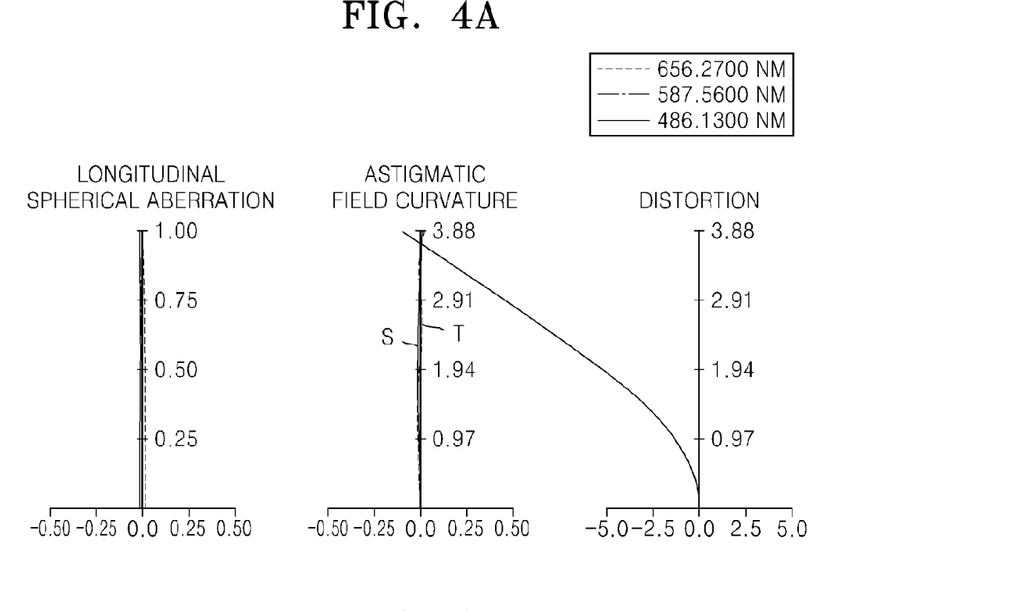
FIGS. 4A and 4B illustrate longitudinal spherical aberration, astigmatic field curvature, and distortion of the zoom lens of FIG. 3 at the wide angle position and the telephoto position.
Figure 4B:
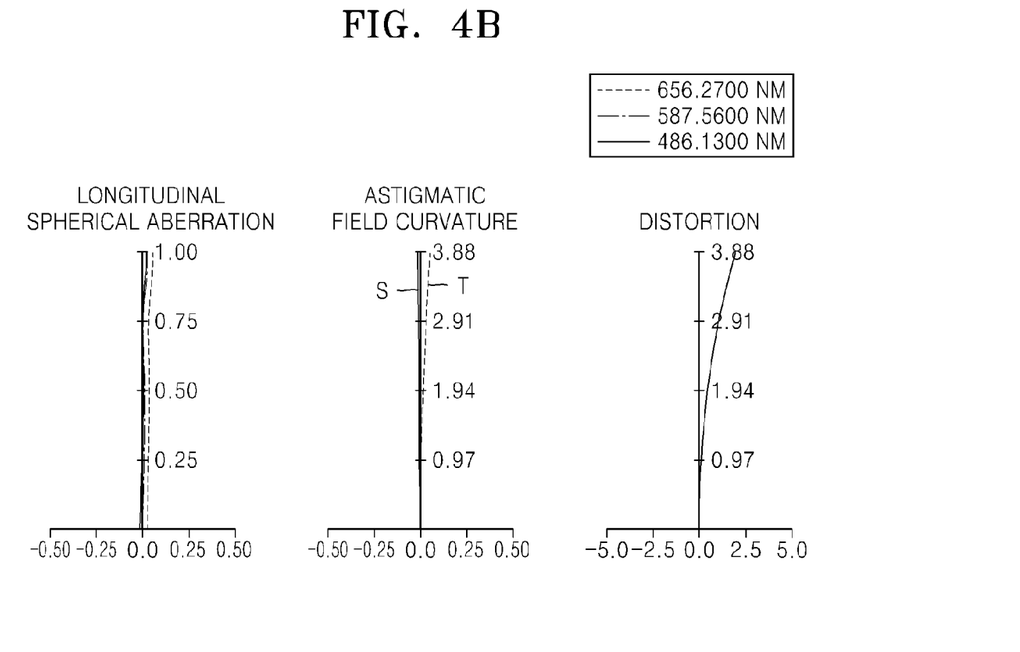

FIG. 3 is a cross-sectional view of a zoom lens according to another embodiment of the invention, and design data of the zoom lens of FIG. 3 is as follows.

| f; 6.01~12.91~30.63 Fno; 3.62~4.62~6.59 2ω; 65.65~33.40~14.42(°) | | | | |
|---|---|---|---|---|
| Lens surface | R | Dn | Nd | Vd |
| OBJ: | INFINITY | INFINITY | | |
| S1: | 36.46981 | 1.996523 | 1.593258 | 48.7932 |
| S2: | −59.95107 | 0.922571 | | |
| S3: | −32.91231 | 0.500000 | 1.743684 | 52.8790 |
| S4: | 6.63776 | 0.742053 | | |
| S5: | 7.65332 | 0.800000 | 1.481200 | 56.5000 |
| ASP: | | | | |
| K: −3.119933 | | | | |
| A: 0.254267E−03 | B: −0.130032E−04 | C: 0.695323E−06 | | |
| D: 0.770454E−09 | | | | |
| S6: | 6.01717 | 0.109615 | | |
| ASP: | | | | |
| K: −1.072527 | | | | |
| A: −0.107898E−03 | B: 0.116583E−04 | C: 0.306857E−06 | | |
| D: −0.307887E−08 | | | | |
| S7: | 6.33138 | 1.940071 | 1.607000 | 27.5000 |
| ASP: | | | | |
| K: −0.131233 | | | | |
| A: −0.145000E−03 | B: 0.483667E−05 | C: −0.132023E−06 | | |
| D: −0.577081E−09 | | | | |
| S8: | 14.37573 | 17.378441 | | |
| ASP: | | | | |

-continued

| f; 6.01~12.91~30.63 Fno; 3.62~4.62~6.59 2ω; 65.65~33.40~14.42(°) | | | | |
|---|---|---|---|---|
| K: −4.216538 | | | | |
| A: −0.140589E−03 | B: −0.610242E−07 | | C: 0.552098E−07 | |
| D: 0.200609E−08 | | | | |
| ST: | INFINITY | 0.000000 | | |
| S10: | 5.97565 | 1.176681 | 1.556571 | 45.3885 |
| ASP: | | | | |
| K: −1.000000 | | | | |
| A: −0.119487E−03 | B: 0.267007E−04 | | C: −0.766699E−05 | |
| D: 0.752173E−06 | | | | |
| S11: | −17.96677 | 0.100000 | | |
| S12: | 6.28447 | 1.913088 | 1.819134 | 45.4015 |
| S13: | −12.46563 | 0.400000 | 1.897200 | 25.9502 |
| S14: | 3.81772 | 4.050557 | | |
| S15: | 20.93084 | 1.321969 | 1.943820 | 18.3075 |
| S16: | −1405.22590 | 3.954530 | | |
| S17: | INFINITY | 0.300000 | 1.516798 | 64.1983 |
| S18: | INFINITY | 0.300000 | | |
| S19: | INFINITY | 0.500000 | 1.516798 | 64.1983 |
| S20: | INFINITY | 0.600029 | | |
| IMG: | INFINITY | | | |

Table 2 shows data regarding variable distances of the zoom lens of FIG. 3 during zooming.

TABLE 2

| Variable distance | Wide angle position | Intermediate position | Telephoto position |
|---|---|---|---|
| D1 | 0.9226 | 4.5037 | 10.8105 |
| D2 | 17.3784 | 6.1192 | 0.5 |
| D3 | 4.0506 | 5.6701 | 14.5281 |
| D4 | 3.9545 | 6.3037 | 6.4435 |

Embodiment 3

Figure 5:
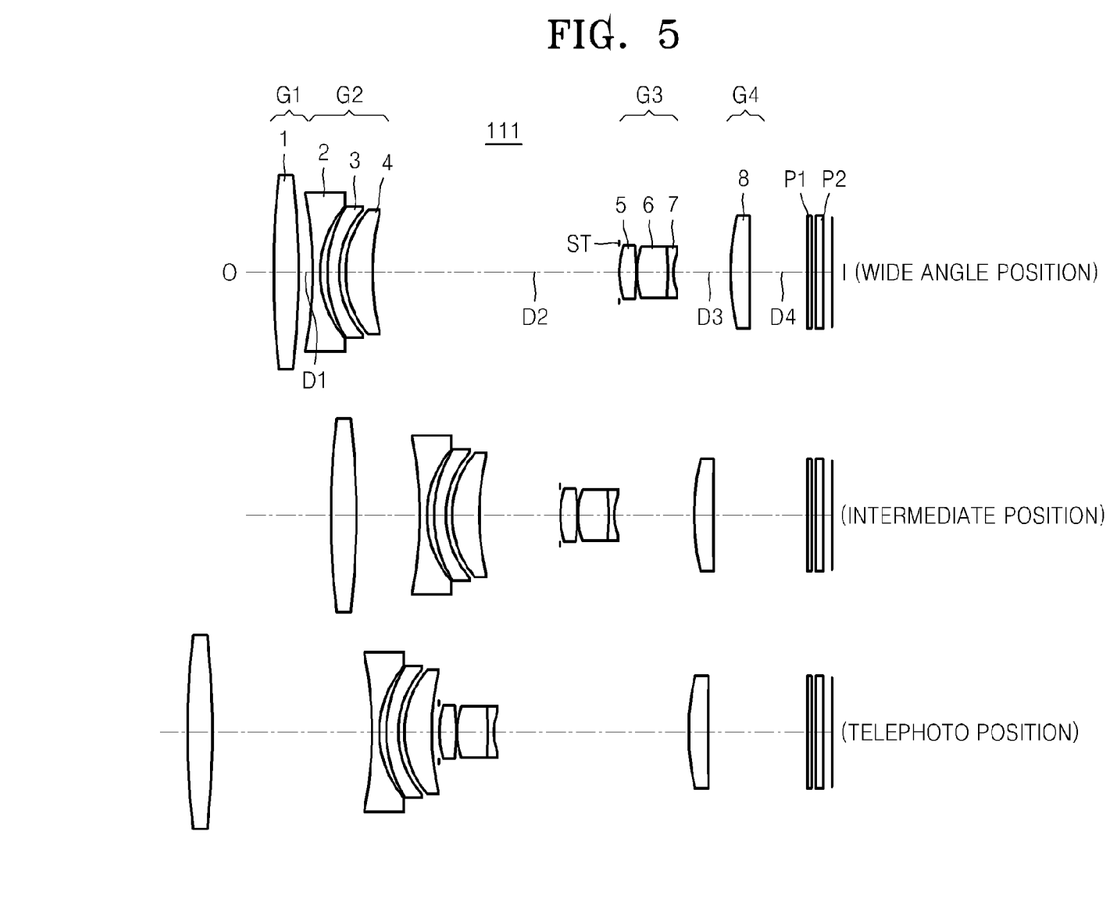
FIG. 5 is a cross-sectional view of a zoom lens according to another embodiment of the invention at a wide angle position, an intermediate position, and a telephoto position.
Figure 6A:
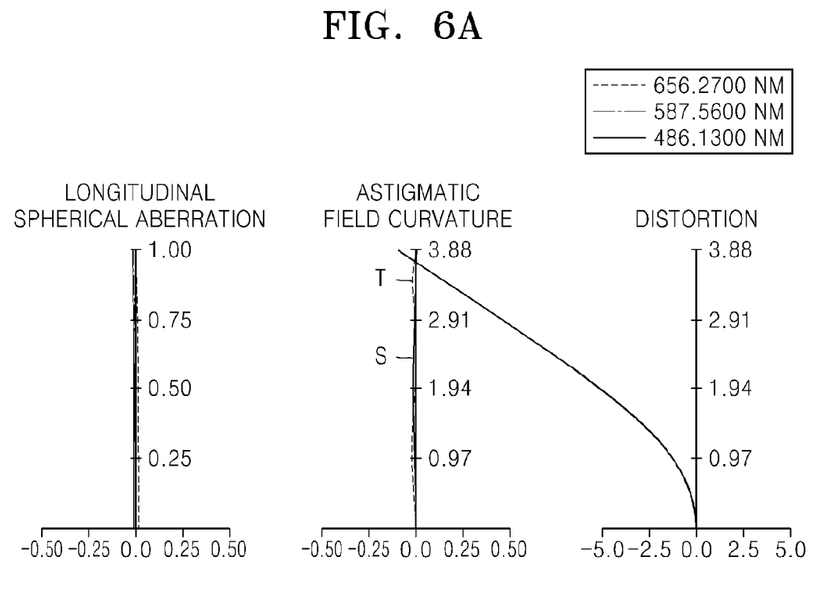
FIGS. 6A and 6B illustrate longitudinal spherical aberration, astigmatic field curvature, and distortion of the zoom lens of FIG. 5 at the wide angle position and the telephoto position.
Figure 6B:
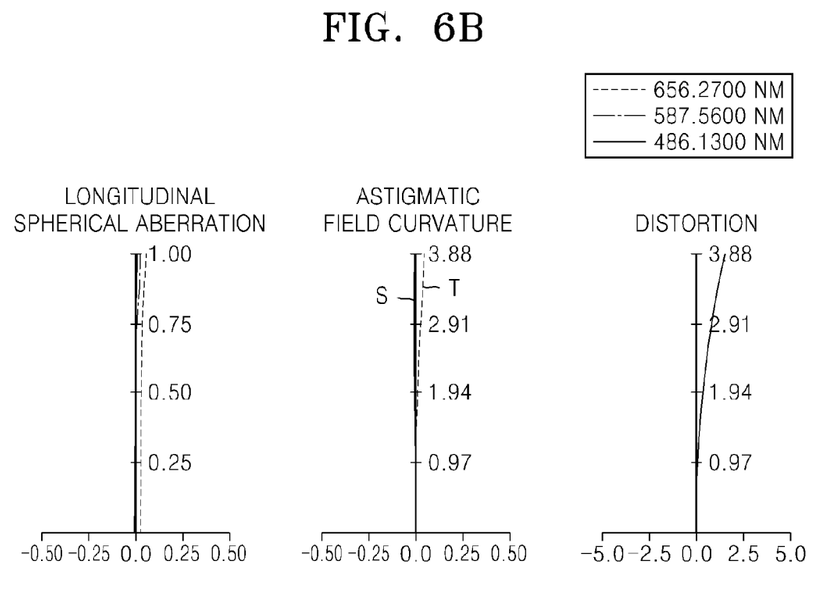

FIG. 5 is a cross-sectional view of a zoom lens according to another embodiment of the invention, and design data of the zoom lens of FIG. 5 is as follows.

| f; 6.15~13.23~28.93 Fno; 3.64~4.66~6.38 2ω; 64.39~32.64~15.26(°) | | | | |
|---|---|---|---|---|
| Lens surface | R | Dn | Nd | Vd |
| OBJ: | INFINITY | INFINITY | | |
| S1: | 54.40500 | 1.773582 | 1.690545 | 47.2456 |
| S2: | −59.80524 | 1.013289 | | |
| S3: | −28.21758 | 0.500000 | 1.645412 | 59.2809 |
| S4: | 7.19612 | 0.495429 | | |
| S5: | 7.61116 | 0.800000 | 1.535196 | 56.3394 |
| ASP: | | | | |
| K: −3.024651 | | | | |
| A: 0.234768E−03 | B: −0.147543E−04 | | C: 0.683919E−06 | |
| D: −0.552809E−08 | | | | |
| S6: | 5.80181 | 0.423467 | | |
| ASP: | | | | |
| K: −1.072366 | | | | |
| A: −0.109132E−03 | B: 0.850402E−05 | | C: 0.208065E−06 | |
| D: −0.405241E−08 | | | | |
| S7: | 6.23626 | 1.925532 | 1.467000 | 27.5000 |
| ASP: | | | | |
| K: −0.206759 | | | | |
| A: −0.257466E−03 | B: 0.375656E−05 | | C: −0.155091E−06 | |
| D: 0.370248E−08 | | | | |
| S8: | 14.27486 | 17.237775 | | |
| ASP: | | | | |
| K: −5.973906 | | | | |
| A: −0.209244E−03 | B: −0.251335E−05 | | C: 0.253006E−06 | |
| D: 0.604615E−09 | | | | |
| ST: | INFINITY | 0.000000 | | |

-continued

| f; 6.15~13.23~28.93 Fno; 3.64~4.66~6.38 2ω; 64.39~32.64~15.26(°) | | | | |
|---|---|---|---|---|
| S10: | 6.33635 | 1.167732 | 1.545362 | 54.0934 |
| ASP: | | | | |
| K: −1.000000 | | | | |
| A: −0.143514E−03 | B: 0.172801E−04 | | C: −0.514636E−05 | |
| D: 0.519708E−06 | | | | |
| S11: | −18.39241 | 0.100000 | | |
| S12: | 6.45449 | 2.105339 | 1.819134 | 45.4015 |
| S13: | −29.46729 | 0.400000 | 1.897200 | 25.9502 |
| S14: | 3.94186 | 3.988900 | | |
| S15: | 18.01231 | 1.308919 | 1.928615 | 21.0689 |
| S16: | 258.28411 | 4.066098 | | |
| S17: | INFINITY | 0.300000 | 1.516798 | 64.1983 |
| S18: | INFINITY | 0.300000 | | |
| S19: | INFINITY | 0.500000 | 1.516798 | 64.1983 |
| S20: | INFINITY | 0.600642 | | |
| IMG: | INFINITY | −0.005930 | | |

Table 3 shows data regarding variable distances of the zoom lens of FIG. 5 during zooming.

TABLE 3

| Variable distance | Wide angle position | Intermediate position | Telephoto position |
|---|---|---|---|
| D1 | 1.0133 | 4.5233 | 11.1617 |
| D2 | 17.2378 | 5.5983 | 0.5 |
| D3 | 3.9889 | 5.6217 | 13.7049 |
| D4 | 4.0661 | 6.5904 | 6.9207 |

Table 4 shows that the zoom lenses of FIGS. 1, 3, and 5 satisfy Formulae 1, 2, 3, and 4.

TABLE 4

| | Embodiment 1 | Embodiment 2 | Embodiment 3 |
|---|---|---|---|
| Formula 1 | 1.5312 | 1.4812 | 1.5352 |
| Formula 2 | 1.607 | 1.607 | 1.467 |
| Formula 3 | 4.749 | 5.1 | 4.7 |
| Formula 4 | 1.665 | 1.5566 | 1.5454 |

Accordingly the zoom lenses according to the embodiments of the invention may have a high zoom ratio, a compact design, and low manufacturing costs. The zoom lenses may be applied to an image pickup device, such as a digital still camera, a single-lens reflex camera, a video camera, or a portable terminal, using a solid state image pickup unit such as a charge-coupled device (CCD) or a complementary metal-oxide semiconductor (CMOS).

Figure 7:
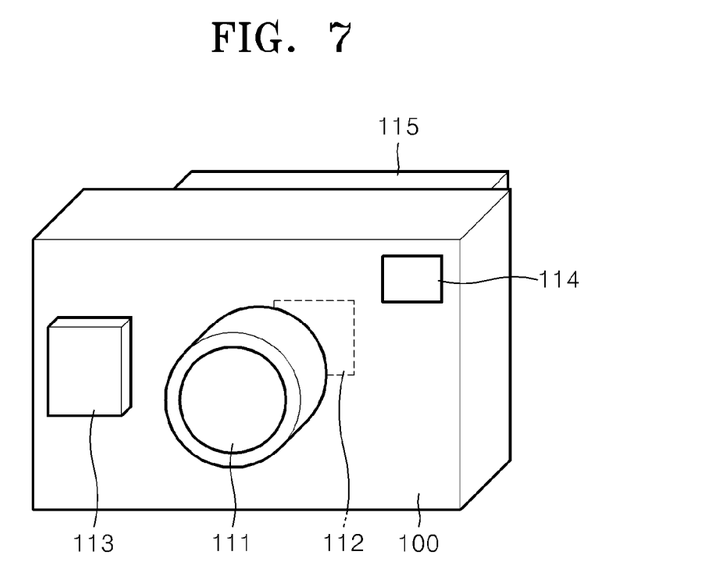
FIG. 7 is a perspective view of an image pickup device according to an embodiment of the invention.

FIG. 7 is a perspective view of an image pickup device 100 including the zoom lens 111 of FIG. 1, according to an embodiment of the invention. The image pickup device 100 includes the zoom lens 111, and an image sensor 112 for converting an optical image formed by the zoom lens 111 into an electrical image signal. The image pickup device 100 may include a recording unit 113 in which information corresponding to an image of a subject that is photo-optically converted by the image sensor 112 is recorded, a viewfinder 114 for observing the image of the subject, and a display unit 115 on which the image of the subject is displayed. Although the viewfinder 114 and the display unit 115 are separately provided in FIG. 7, the embodiment is not limited thereto and only the display unit 115 may be provided without the viewfinder 114. Although the image pickup device 100 of FIG. 7 is exemplarily shown, the embodiment is not limited thereto and any of various optical equipments may be used. If the zoom lens 111 according to the invention is applied to an image pickup device, such as a digital camera, the image pickup device may be compact and inexpensive and have a high magnifying power.

While embodiments of the invention has been particularly shown and described, it will be understood by one of ordinary skill in the art that various changes in form and details may be made therein without departing from the spirit and scope of the invention as defined by the following claims.

What is claimed is:

1. A zoom lens comprising:
a first lens group having a positive refractive power;
a second lens group having a negative refractive power;
a third lens group having a positive refractive power; and
a fourth lens group having a positive refractive power,
wherein the first through fourth lens groups are sequentially arranged from an object side to an image side, when zooming is performed from a wide angle position to a telephoto position, the distance between the first lens group and the second lens group increases, the distance between the second lens group and the third lens group decreases, and the distance between the third lens group and the fourth lens group increases, the second lens group comprises a first lens, a second lens, and a third lens, and the second lens group satisfies $1.45 \leq N_{(2-2)} \leq 1.65$, and $1.45 \leq N_{(2-3)} \leq 1.65$, where $N_{(2-2)}$ is the refractive index of the second lens of the second lens group, and $N_{(2-3)}$ is the refractive index of the third lens of the second lens group.

2. The zoom lens of claim 1, wherein the first lens of the second lens group has a negative refractive power, the second lens of the second lens group has a negative refractive power, and the third lens of the second lens group has a positive refractive power.

3. The zoom lens of claim 2, wherein the second lens and the third lens of the second lens group are aspherical lenses.

4. The zoom lens of claim 2, wherein the first lens of the second lens group is a biconcave lens, and the second lens and the third lens of the second lens group are meniscus lenses.

5. The zoom lens of claim 1, wherein the second lens and the third lens of the second lens group are plastic lenses.

6. The zoom lens of claim 1, wherein the zoom lens satisfies $$4.6 \leq \frac{ft}{fw} \leq 5.4,$$

and $$1.45 \leq N_{(3-1)} \leq 1.65,$$

where fw is the overall focal length at the wide angle position, ft is the overall focal length at the telephoto position, and $N_{(3-1)}$ is the refractive index of the lens closest to the object side of the third lens group.

7. The zoom lens of claim 1, wherein the third lens group comprises a doublet lens.

8. The zoom lens of claim 1, wherein the fourth lens group comprises one lens.

9. The zoom lens of claim 8, wherein the one lens of the fourth lens group has a refractive index greater than 1.85.

10. The zoom lens of claim 1, wherein the fourth lens group performs focusing.

11. The zoom lens of claim 1, wherein the first lens group comprises one lens.

12. The zoom lens of claim 11, wherein the one lens of the first lens group is a biconvex lens.

13. An image pickup device comprising:
a zoom lens; and
an image sensor for converting an optical image formed by the zoom lens into an electrical signal,
wherein the zoom lens comprises:
a first lens group having a positive refractive power;
a second lens group having a negative refractive power;
a third lens group having a positive refractive power; and
a fourth lens group having a positive refractive power,
wherein the first through fourth lens groups are sequentially arranged from an object side to an image side, when zooming is performed from a wide angle position to a telephoto position, the distance between the first lens group and the second lens group increases, the distance between the second lens group and the third lens group decreases, and the distance between the third lens group and the fourth lens group increases, the second lens group comprises a first lens, a second lens, and a third lens, and the second lens group satisfies $1.45 \leq N_{(2-2)} \leq 1.65$, and $1.45 \leq N_{(2-3)} \leq 1.65$, where $N_{(2-2)}$ is the refractive index of the second lens of the second lens group, and $N_{(2-3)}$ is the refractive index of the third lens of the second lens group.

14. The image pickup device of claim 13, wherein the first lens of the second lens group has a negative refractive power, the second lens of the second lens group has a negative refractive power, and the third lens of the second lens group has a positive refractive power.

15. The image pickup device of claim 14, wherein the second lens and the third lens of the second lens group are aspherical lenses.

16. The image pickup device of claim 14, wherein the first lens of the second lens group is a biconcave lens, and the second lens and the third lens of the second lens group are meniscus lenses.

17. The image pickup device of claim 13, wherein the zoom lens satisfies $$4.6 \leq \frac{ft}{fw} \leq 5.4,$$

and $$1.45 \leq N_{(3-1)} \leq 1.65,$$

where fw is the overall focal length at the wide angle position, ft is the overall focal length at the telephoto position, and $N_{(3-1)}$ is the refractive index of the lens closest to the object side of the third lens group.

* * * * *